United States Patent Office 3,033,854
Patented May 8, 1962

3,033,854
NEW AMINOMETHYL-STEROIDS AND PROCESS
FOR THEIR MANUFACTURE
Albert Eschenmoser, Zurich, Switzerland, assignor to
Ciba Pharmaceutical Products Inc., Summit, N.J.
No Drawing. Filed Feb. 9, 1960, Ser. No. 7,529
Claims priority, application Switzerland Feb. 10, 1959
4 Claims. (Cl. 260—239.5)

The present invention provides new 2-aminomethyl compounds of Δ⁴-3-keto-steroids.

The new aminomethyl-steroid compounds are obtained by reacting a Δ⁴-2-hydroxymethylene-3-keto-steroid with a secondary amine and reducing the resulting 2-enamine with a metal hydride, hydrolysing any ketalized keto groups present and, if desired, converting the resulting amine into a salt thereof.

The present process is illustrated by the following scheme of formulae:

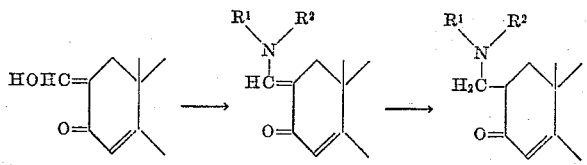

in which $R^1$ and $R^2$ represent alkyl radicals or $R^1+R^2$ stand for an alkylene radical.

According to the present process the Δ⁴-2-hydroxymethylene-3-keto-steroids used as starting materials are reacted with a secondary aliphatic or cycloaliphatic amine, for example with dimethylamine, diethylamine, or more especially with pyrrolidine, piperidine or the like. The reaction is advantageously carried out in a suitable diluent, for example in an organic solvent such as an alcohol, ether, hydrocarbon, or in a mixture of two or more such solvents, or in an excess of amine, and the temperature used may range, for example, from −10° C. to 150° C. It is easy to follow the progress of the reaction by measuring the ultraviolet absorption. The 2-enamines formed display a characteristic ultraviolet absorption at about 380 mμ.

The reduction of the 2-enamine formed may be carried out with a metal hydride, more especially one of the type of lithium aluminum hydride or lithium tritertiary butoxy aluminum hydride of which an excess is advantageously used. The reduction is performed in the presence of a suitable solvent that is inert towards the reducing agent, for example in an ether such as diethyl ether, dioxane or tetrahydrofuran, advantageously at a temperature between room temperature and the boiling temperature of the solvent employed. Surprisingly, it has been observed that the Δ⁴-3-keto grouping is not reduced, although an excess of metal hydride is used. Ketalized keto groups, for example in the 20-position, are hydrolysed after the reduction with the metal hydride in the known manner, for example with an acid, such as acetic acid, para-toluenesulfonic acid or perchloric acid.

The new Δ⁴-2-secondary aminomethyl-3-keto-steroids obtained as final products can be converted in the known manner into their salts, such as hydrochlorides, sulfates, tartrates, citrates or the like.

The Δ⁴-2-hydroxymethylene-3-keto-steroids used as starting materials may belong to any one of the following series: cholestane, sitostane, ergostane, spirostane, cholane, nor-cholane, bis-nor-cholane, pregnane or androstane. Apart from those mentioned above, these starting materials may contain further substituents, such as free or functionally converted hydroxyl, oxo or carboxyl groups, also methyl groups, and they may also contain further double bonds. In the course of the reduction with a metal hydride according to the present process, free oxo groups are reduced to hydroxyl groups, free and functionally converted carboxyl groups are converted into hydroxymethyl groups and ethinyl groups into vinyl groups. Specific starting materials are, for example, the 2-hydroxymethylene compounds of testosterone, 17α-methyl-testosterone, 17α-ethinyl-testosterone, progesterone- and 17α-acetoxy-progesterone-20-monoethylene ketal, cortisone-17:20;20:21-bismethylene ketal, Δ⁴-cholesterone and Δ⁴-3-keto-spirostene.

The products of the invention display biological action or can be used as intermediates in the manufacture of therapeutically active compounds. Thus for example the 2-pyrrolidinomethyl-testosterone shows an anabole action.

Particular mention deserve the 2-secondary aminomethyl compounds, for example the 2-pyrrolidino-methyl compounds of testosterone, 17α-methyl-testosterone, progesterone, 17α-acetoxy-progesterone, cortisone, cholestenone and Δ⁴-3-keto-spirostene.

The following examples illustrate the invention:

Example 1

5 grams of Δ⁴-2-hydroxymethylene-3-keto-cholestene are dissolved in 100 cc. of methanol, 100 cc. of pyrrolidine are added, and the mixture is kept for 18 hours at 20° C. The solvent, together with the excess pyrrolidine, is distilled off in vacuo at 40° C., and the residue is repeatedly evaporated with benzene and then recrystallized from petroleum ether. Δ⁴-2-pyrrolidinomethylene-3-keto-cholestene, which is obtained in a yield of 85 to 90%, melts at 118–119° C. and displays in the ultraviolet absorption spectrum maxima at 251 mμ/log ε=4.23 and at 380 mμ/log ε=4.15.

3 grams of the 2-enamine obtained in this manner are dissolved in 200 cc. of absolute ether, added dropwise to a vibrated suspension of 3 grams of lithium aluminum hydride in 200 cc. of absolute ether, and the whole is heated for 4 hours at 35° C. The reaction mixture is strongly cooled, treated with saturated Seignette salt solution and diluted with ether. The ethereal layer is washed with water until neutral, dried over anhydrous sodium sulfate and evaporated in vacuo. The resulting residue is a colorless oil which does not crystallize. The infrared spectrum of the compound contains the double bond of the α:β-unsaturated ketone at 6.02 and at 6.16μ.

To prepare the pure 2-pyrrolidinomethyl compound the crude reaction product is dissolved in absolute ether and while being cooled with ice neutralized with an alcoholic hydrogen chloride solution. The solvent is evaporated and the resulting hydrochloride of Δ⁴-2-pyrrolidinomethyl-3-keto-cholestene is crystallized from acetone. It melts at 180–184° C. with decomposition.

Reaction of an alcoholic solution of the free base with an aqueous alcoholic solution of citric acid yields the corresponding citrate which melts at 205–210° C.

Example 2

2 grams of 2-hydroxymethylene-testosterone are dissolved in 100 cc. of benzene and boiled with 1 gram of pyrrolidine for 2 hours in a water separator. A further 1 gram of pyrrolidine is added and the whole is heated for another hour. The benzene and the excess of pyrrolidine are evaporated in a water-jet vacuum. The crude product (2.6 grams) displays in the ultraviolet absorption spectrum maxima at 251 mμ/log ε=4.15 and at 380 mμ/log ε=4.11. It can be subjected to reduction without requiring previous purification.

A solution of the crude 2-enamine in 100 cc. of tetrahydrofuran is slowly stirred dropwise into a suspension of 2 grams of lithium aluminum hydride in 150 cc. of ether. The whole is refluxed for 3 hours, and the reaction mixture is then cooled with ice+sodium chloride cooling mixture and decomposed with saturated Seignette salt solution, carefully extracted with ether+methylene chloride, washed with water, dried over sodium sulfate, and the solvent is distilled off in a water-jet vacuum at 30° C. On being sprinkled with benzene, much of the brown oil crystallizes in long needles. Recrystallization from benzene yields 1.24 grams of 2-pyrrolidinomethyl-testosterone, melting at 190–192° C. with decomposition. Optical rotation $[\alpha]_D = +40°$.

*Example 3*

1 gram of 2-hydroxymethylene-17α-methyl-testosterone is dissolved in 30 cc. of ether with the addition of 1 gram of pyrrolidine, and the whole is refluxed for 3 hours. Evaporation of the reaction solution in a water-jet vacuum yields a dark yellow oil; its ultraviolet absorption spectrum reveals the presence of practically pure 2 - pyrrolidinomethylene - 17α - methyl - testosterone. $\lambda_{max} = 251$ mμ, log $\epsilon = 4.17$; 380 mμ, log $\epsilon = 4.13$.

The crude 2-enamine is dissolved in 50 cc. of dioxane and added dropwise to a suspension of 1 gram of lithium aluminum hydride in 50 cc. of ether and 50 cc. of dioxane. While being vigorously stirred the reaction mixture is refluxed for 1 hour and then worked up with the addition of ether and saturated Seignette salt solution as described in Examples 1 and 2. In this manner 2-pyrrolidinomethyl-17α-methyl-testosterone can be isolated in a yield of 30%. Melting point 168–172° C. (with decomposition). The melting point depends largely on the rapidity of the determination.

*Example 4*

1 gram of 2-hydroxymethylene-17:20;20:21-bis-methylenedioxy-cortisone is reacted with 200 cc. of pyrrolidine and stirred for 18 hours at 20° C. After repeatedly evaporating the reaction mixture with benzene in vacuo, a brown oil is obtained which crystallizes in yellow prisms on being sprinkled with methanol. The ultraviolet spectrum of the crude product contains the characteristic bands of the $\Delta^4$-3-keto-2-enamines at 250 mμ, log $\epsilon = 4.15$ and at 380 mμ, log $\epsilon = 4.1$. It can be subjected to the reduction without previous purification.

A solution of the crude 2-enamine in 100 cc. of tetrahydrofuran is added dropwise to a vibrated suspension of 2 grams of lithium aluminum hydride in 100 cc. of ether, and the whole is then refluxed for 3 hours. While cooling the reaction solution, it is treated with saturated Seignette salt solution, diluted with ether, washed until neutral, dried and evaporated at 30° C. in vacuo. The distillation residue is a pale-yellow, partially crystalline oil. Recrystallization from methylene chloride+petroleum ether yields the 2-pyrrolidinomethyl-17:20;20:21-bis-methylenedioxy-cortisone which melts at 195–198° C. with decomposition and, on being subjected to ketal cleavage with para-toluenesulfonic acid in acetone at room temperature, yields 2-pyrrolidinomethyl-cortisone.

What is claimed is:

1. Process for the manufacture of aminomethyl-steroids, wherein a $\Delta^4$-2-hydroxymethylene-3-keto-steroid is reacted with a member selected from the group consisting of a secondary aliphatic amine and a secondary cycloaliphatic amine and the resulting 2-enamine reduced with a member selected from the group consisting of an aluminum alkali metal complex hydride and an alkoxy derivative thereof, any ketalized keto groups present hydrolysed, and the resulting amine converted into a therapeutically useful acid addition salt thereof.

2. Process as claimed in claim 1, wherein pyrrolidine is used as secondary amine.

3. Process as claimed in claim 1, wherein lithium aluminum hydride is used for the reduction of the 2-enamine.

4. 2-pyrrolidinomethyl testosterone and its therapeutically useful acid addition salts.

References Cited in the file of this patent

Patton: Chemistry & Industry (Great Britain), pages 923–24, July 18, 1959.